United States Patent
Pearson

(10) Patent No.: US 9,430,012 B2
(45) Date of Patent: Aug. 30, 2016

(54) SYSTEMS AND METHODS OF TRANSFORMER FAILURE DETECTION AND CONTROL

(71) Applicant: General Electric Company, Schenectady, NY (US)

(72) Inventor: William Robert Pearson, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 616 days.

(21) Appl. No.: 13/711,604

(22) Filed: Dec. 11, 2012

(65) Prior Publication Data

US 2014/0163760 A1 Jun. 12, 2014

(51) Int. Cl.
*G06F 1/30* (2006.01)
*H02P 9/10* (2006.01)

(52) U.S. Cl.
CPC .. *G06F 1/30* (2013.01); *H02P 9/10* (2013.01)

(58) Field of Classification Search
CPC .......... H02P 29/021; H02P 9/10; H02P 9/00; H02P 9/08; G06F 1/30; G06F 1/305
USPC ........................................ 700/292
See application file for complete search history.

(56) References Cited

U.S. PATENT DOCUMENTS

| | | | | |
|---|---|---|---|---|
| 4,200,897 A | * | 4/1980 | Dawley | 361/45 |
| 5,055,703 A | * | 10/1991 | Schornack | 307/64 |
| 5,963,406 A | * | 10/1999 | Neiger et al. | 361/42 |
| 6,088,205 A | * | 7/2000 | Neiger et al. | 361/42 |
| 6,128,169 A | * | 10/2000 | Neiger et al. | 361/42 |
| 6,339,525 B1 | * | 1/2002 | Neiger et al. | 361/42 |
| 6,400,277 B2 | * | 6/2002 | Guedes | 340/646 |
| 6,407,893 B1 | * | 6/2002 | Neiger et al. | 361/42 |
| 6,421,214 B1 | * | 7/2002 | Packard et al. | 361/7 |
| 6,433,978 B1 | * | 8/2002 | Neiger et al. | 361/42 |
| 6,639,769 B2 | * | 10/2003 | Neiger et al. | 361/42 |
| 7,701,357 B2 | * | 4/2010 | Deaver, Sr. | G01R 19/16547 340/646 |
| 7,965,193 B2 | * | 6/2011 | Deaver, Sr. | G01R 19/16547 340/646 |
| 8,837,094 B2 | * | 9/2014 | Hasegawa | 361/18 |
| 8,872,667 B2 | * | 10/2014 | Bhageria | G08B 21/00 340/635 |
| 2001/0053055 A1 | * | 12/2001 | Guedes | 361/100 |
| 2002/0125837 A1 | * | 9/2002 | Noda et al. | 315/225 |
| 2004/0095783 A1 | * | 5/2004 | Tani | 363/16 |
| 2005/0286184 A1 | * | 12/2005 | Campolo | 361/42 |
| 2008/0012677 A1 | * | 1/2008 | Colsch et al. | 336/178 |
| 2008/0106425 A1 | * | 5/2008 | Deaver | G01R 19/16547 340/646 |

(Continued)

OTHER PUBLICATIONS

GEI-100784B; "EX2100e Excitation Control for 35 A Regulator Systems"; Issued Oct. 22, 2010; pp. 1-32.

*Primary Examiner* — Charles Kasenge
(74) *Attorney, Agent, or Firm* — Flectcher Yoder, P.C.

(57) ABSTRACT

A system includes an excitation system configured to regulate one or more outputs of a power generating system. The excitation system includes data processing circuitry configured to obtain an electrical voltage measurement and an electrical current measurement associated with the power generating system, a transformer failure detection system configured to detect an abnormality associated with the electrical voltage and electrical current measurements as an indication of a possible transformer failure, and a failure detection deactivation system configured to deactivate the transformer failure detection system based at least in part on whether the abnormality comprises one of a first condition or a second condition.

20 Claims, 5 Drawing Sheets

(56) References Cited

U.S. PATENT DOCUMENTS

| | | | |
|---|---|---|---|
| 2009/0185105 A1* | 7/2009 | Hasegawa | 349/61 |
| 2010/0102976 A1* | 4/2010 | Lee | G01H 1/003 340/646 |
| 2010/0156649 A1* | 6/2010 | Deaver, Sr. | G01R 19/16547 340/646 |
| 2011/0163669 A1* | 7/2011 | Hasegawa | 315/76 |
| 2011/0205770 A1* | 8/2011 | Isogai et al. | 363/78 |
| 2012/0200279 A1* | 8/2012 | Pamulaparthy et al. | 323/301 |
| 2012/0236614 A1* | 9/2012 | Kamata | 363/131 |
| 2012/0327745 A1* | 12/2012 | Yardibi | G01S 3/80 367/121 |
| 2013/0063273 A1* | 3/2013 | Bhageria | G08B 21/00 340/653 |
| 2013/0182355 A1* | 7/2013 | Coca Figuerola | H01F 27/402 361/35 |

* cited by examiner

SYSTEMS AND METHODS OF TRANSFORMER FAILURE DETECTION AND CONTROL

BACKGROUND

The subject matter disclosed herein relates to transformers, and more specifically, to the detection and control of possible failures of transformers.

Certain systems that use transformers, such as generators and distributed generators, may rely on voltage regulators to perform various monitoring and control operations, such as magnetic field excitation and regulation. Excitation controllers may receive various feedback signals to provide control flexibility, but most generally include voltage and current feedback signals to regulate and control the output of, for example, generators, turbines, motors, or other similar synchronous machines, for example, of a power generating system. Unfortunately, the voltage feedback signals due to a possible transformer failure or external disturbances of the power generating system may not be distinguishable to the excitation controllers.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes an excitation system configured to regulate one or more outputs of a power generating system. The excitation system includes data processing circuitry configured to obtain an electrical voltage measurement and an electrical current measurement associated with the power generating system, a transformer failure detection system configured to detect an abnormality associated with the electrical voltage and electrical current measurements as an indication of a possible transformer failure, and a failure detection deactivation system configured to deactivate the transformer failure detection system based at least in part on whether the abnormality comprises one of a first condition or a second condition.

A non-transitory computer-readable medium having computer executable code stored thereon, the code comprising instructions to obtain an electrical voltage measurement and an electrical current measurement associated with a power generating system, detect an abnormality associated with the electrical voltage and electrical current measurements as an indication of a possible transformer failure, and deactivate a transformer failure detection system based at least in part on whether the abnormality comprises one of a first condition or a second condition.

A system includes a transformer failure detection system configured to detect an abnormality associated with electrical voltage and electrical current measurements as an indication of a possible transformer failure and a failure detection deactivation system. The failure detection deactivation system is configured to calculate a magnitude of the electrical current measurements, and to deactivate the transformer failure detection system when the magnitude of the electrical current measurements exceeds a predetermined current magnitude threshold.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
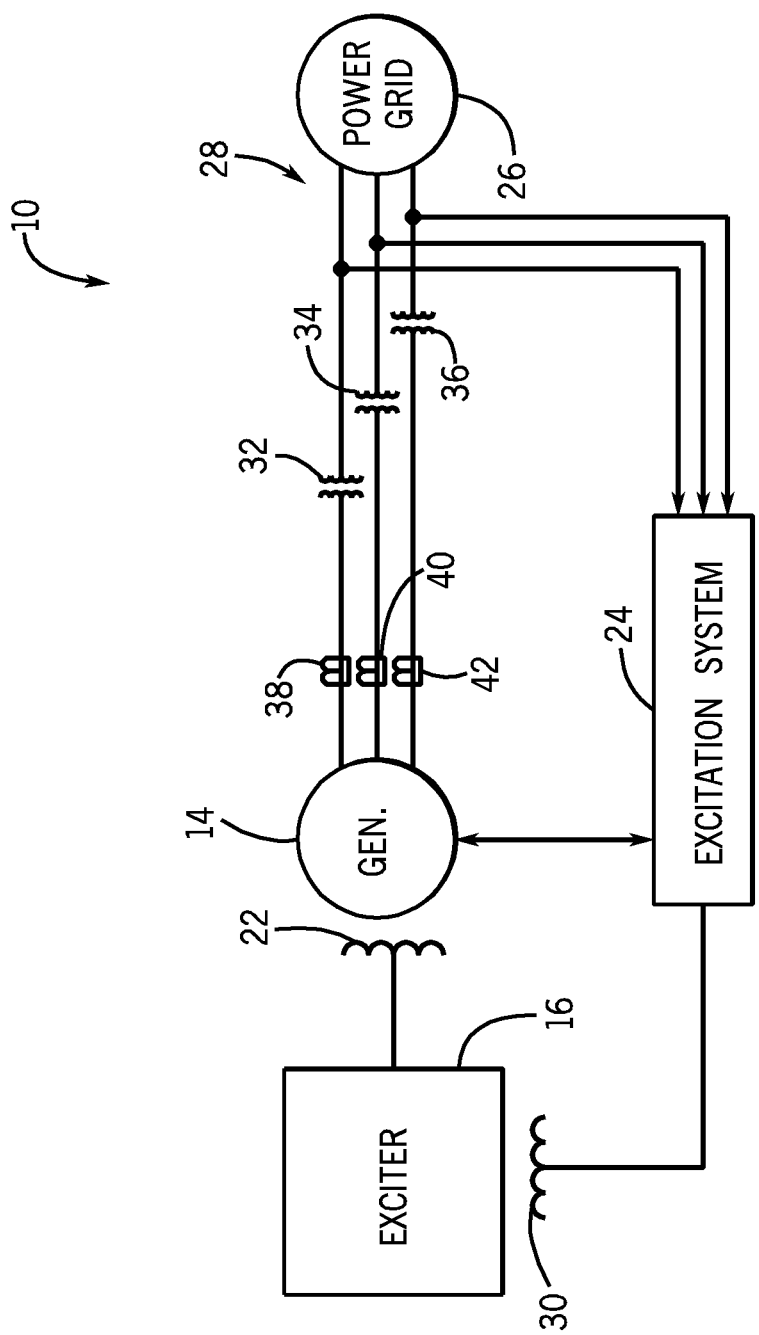
FIG. 1 is a block diagram of an embodiment of a turbine-generator system in accordance with present embodiments.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Certain energy and power generating systems, such as generators and distributed generators (e.g., photovoltaic panels, hydroturbines, carbonaceous fuel generators, and wind turbines), may rely upon excitation and/or power conversion systems to perform various monitoring, control, and/or management operations, such as magnetic field excitation and voltage regulation (e.g., terminal voltage regulation and/or field voltage regulation). Field excitation systems may include various feedback signals to provide control flexibility, but most generally include voltage and current feedback signals to regulate and control the output of, for example, generators, turbines, motors, or other similar synchronous machines that may be included as part of a power generating system. Unfortunately, the voltage feedback signals may provide distorted information due to certain disturbances of the power generating system. For example, as field excitation systems may rely upon potential transformers (PTs) and/or voltage transformers (VTs) to determine, for example, the terminal voltage of a generator, abnormal voltages (e.g., sagging voltages, distorted voltages, and so forth) may be detected by the field excitation control systems as a possible failure of the PTs and/or VTs. However, certain abnormal voltages may be the result of an electrical fault at the terminal of the generator, for example, and not representative of a failure of the PTs and/or VTs.

Accordingly, present embodiments relate to systems and methods useful in differentiating between abnormal voltage conditions resulting from electrical faults, and those conditions representative of actual failures of one or more of PTs and/or VTs that may be included, for example, within the power generating system. In one embodiment, an excitation system includes a transformer failure detection system and a failure detection deactivation system. Specifically, the transformer failure detection system may be used to detect abnormal voltages as a possible indication of a failure of one or more of PTs and/or VTs, and to switch to one of two operating modes in response to such a detection. By way of contrast, the failure detection deactivation system may be used to differentiate between abnormal voltages resulting from electrical faults and those abnormal voltages due to actual failures of the one or more of PTs and/or VTs based upon electrical current information received current transformers (CTs) that may be included, for example, within the power generating system. In particular, the failure detection deactivation system may be used to deactivate the transformer failure detection system when abnormal voltage conditions result from electrical faults, and to not deactivate the transformer failure detection system when the abnormal voltage conditions result from actual failures of the one or more of PTs and/or VTs. As used herein, a "failure" may refer to a breakdown, a decline in the performance of, or an occasion when an apparatus or device (e.g., PTs) may no longer be operating within manufacturer specifications, adequately and/or desirably.

With the foregoing in mind, it may be useful to describe an embodiment of a power generating system, such as an example power generating system 10 illustrated in FIG. 1. The power generating system 10 may include various subsystems such as a generator 14 and a generator exciter 16. The generator exciter 16 may provide a direct current (DC) to the field windings 22 of the generator 14. Particularly, a DC field current (e.g., the current utilized by the field windings 22 of the generator 14 and/or a motor to establish a magnetic field for operation) may be included to excite the magnetic field of the generator 14. For example, the generator exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant. For example, in some embodiments, the power generating system 10 may instead include an electrical motor drive, and the power grid 26 may be replaced by mechanical loads (e.g., compressors and/or turbines).

The power generating system 10 may also include an excitation system 24, which may provide various control parameters to each of the generator 14 and the exciter 16. In certain embodiments, the excitation system 24 may function as an excitation and voltage regulator for the generator 14 and the exciter 16. That is, the excitation system 24 may include one or more power conversion modules that receive AC power, DC power, or a combination thereof, from a source, and may provide power, control, and monitoring to the generator 14 and/or exciter 16 based thereon. Thus, the excitation system 24 and the exciter 16 may operate collectively to manage field 22 requirements of generator 14 in accordance with a desired output (e.g., grid 26 voltage and power factor). As will be further appreciated, the excitation system 24 may include a transformer failure detection system and a failure detection deactivation system to regulate various control parameters of the power generating system 10. For example, the excitation system 24 may be an excitation controller system, such as the EX2100e™ regulator, available from General Electric Co., of Schenectady, N.Y.

In certain embodiments, the excitation system 24 may receive inputs via potential transformers (PTs) 32, 34, and 36 and current transformers (CTs) 38, 40, and 42. The PTs 32, 34, and 36, which may also be referred to herein as voltage transformers (VTs), may each be coupled to the terminals of the generator 14. Specifically, the PTs 32, 34, and 36 may each include primary and secondary windings included to transform the generator 14 operational voltage from a primary voltage (e.g., 4160V to 22 kV) to a standardized secondary voltage (e.g., 115V to 120V) for sensing and processing operations by the excitation system 24. It should be appreciated that the PTs 32, 34, and 36 may be any voltage transformers such as instrument potential transformers, capacitance potential transformers, and so forth. Similarly, the CTs 38, 40, and 42 may each be coupled to the terminals of the generator 14. The CTs 38, 40, and 42 may each include primary and secondary windings included to transform the generator 14 operational current from a primary current (e.g., 5000 A) to a standardized secondary current (e.g., 1 A or 5 A) for sensing and processing operations by the excitation system 24. As will be further appreciated, the voltage values received from the PTs 32, 34, and 36 and the current values received from the CTs 38, 40, and 42 may be used by the excitation system 24 to detect a possible failure and/or malfunctioning of the PTs 32, 34, and 36.

In certain embodiments, the excitation system 24 may include code or instructions stored in a non-transitory machine-readable medium (e.g., memory and/or other storage) and executed, for example, by one or more processors that may be included in the excitation system 24. For example, the excitation system 24 may include metrology circuitry, analog front end (AFE) circuitry, voltage reference circuitry, real-time clocks, data converters, and similar data processing and/or other circuitry. Additionally, the excitation system 24 may be enclosed (e.g., illustrated by the dashed line) inside of, for example, a finished cabinet, such that the excitation system 24 may be panel mounted or retrofitted as a standalone and/or integrated system. As will be further appreciated, the excitation system 24 may include various components (e.g., hardware components, software components, or a combination thereof) useful in detecting possible failures of the PTs 32, 34, and 36, detecting electrical faults that may occur within the power generating system 10, as well as providing control actions to mitigate undesired operations of protective devices of the system 10. Although not illustrated, in other embodiments, the excitation system 24 may also include a system of integrated power electronic switching devices such as silicon-controlled rectifiers (SCRs), thyristors, insulated gate bipolar transistors (IGBTs), and so forth, which may be used to switch from "ON" (e.g., activated and/or enabled) and "OFF" (e.g., deactivated and/or disabled) states to control the voltage and/or current supplied to generator 14 and the exciter 16.

Figure 2:
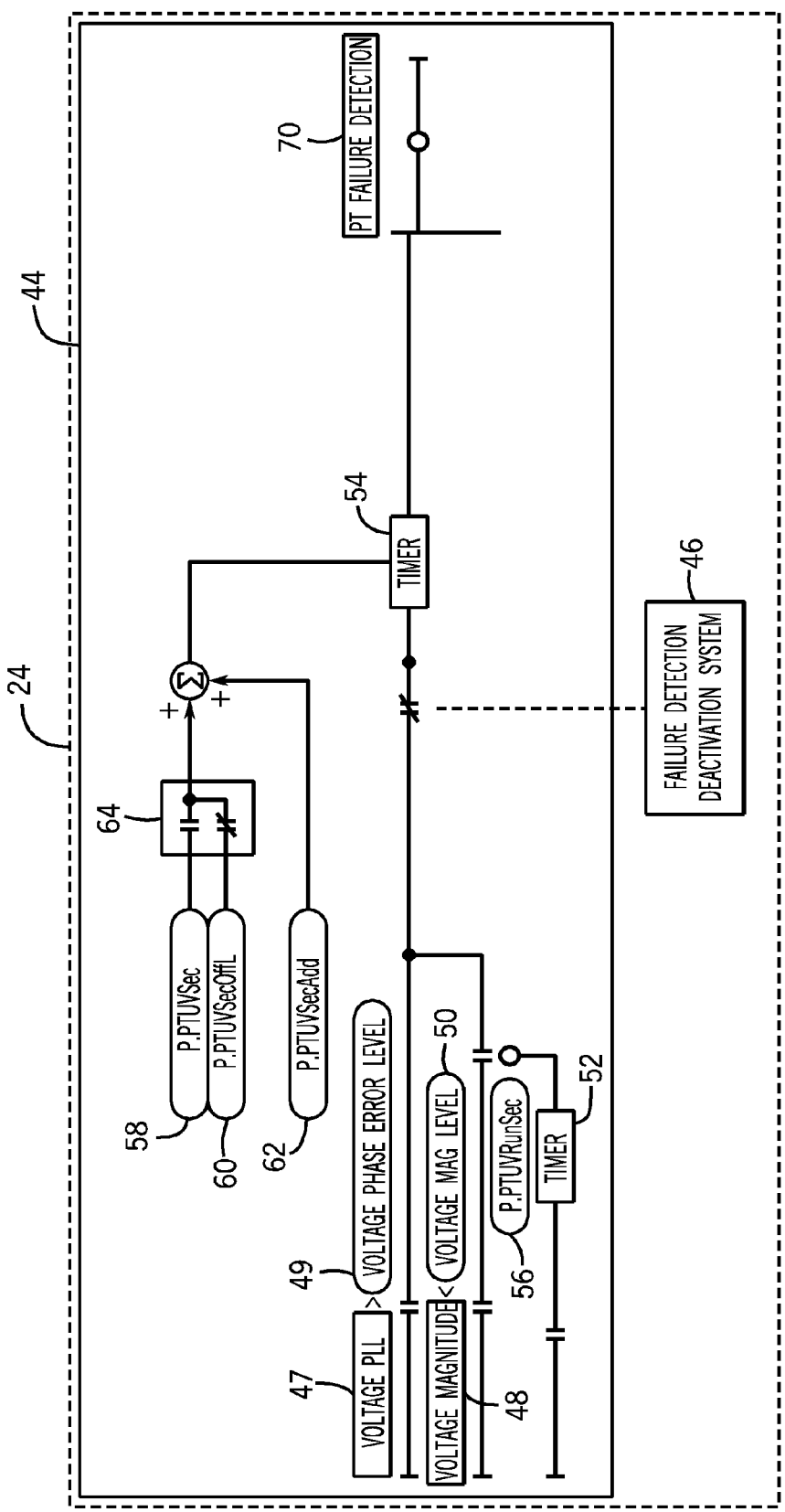
FIG. 2 is a schematic diagram of an embodiment of an excitation system included in the system of FIG. 1 including a transformer failure detection system and a failure detection deactivation system, in accordance with present embodiments.

FIG. 2 is a schematic diagram of an embodiment of a transformer failure detection system 44 and a failure detection deactivation system 46 of the excitation system 24 as described above. As previously noted, in certain embodiments, the excitation system 24 may include various systems (e.g., hardware systems, software systems, or a combination thereof) that may be used to detect possible instrument (e.g., PTs 32, 34, and 36) failures and/or protective device operations (e.g., blown fuses, open switches, operations of reclosers, and so forth) that may be coupled to the generator 14 and/or exciter 16. As depicted, the failure detection system 44 may include phase lock loop (PLL) subsystem 47 and voltage magnitude calculation subsystem 48. In referring herein to FIG. 2 and FIG. 3, it should be appreciated that the rectangular-shaped figure elements (e.g., PLL subsystem 47, voltage magnitude calculation system 48) as illustrated in FIG. 2 may represent computational and/or sampling systems (e.g., software systems stored in memory). On the other hand, the oval-shaped figure elements (e.g., voltage phase error level 49, voltage magnitude level 50) as illustrated in FIG. 2 may represent calculated, estimated, and/or programmed threshold parameters used, for example, as setpoints to facilitate control and monitoring of the generator 14 and/or exciter 16. In other words, the oval-shaped figure elements may represent predetermined and/or calculated threshold parameters corresponding to the rectangular-shaped figure elements (e.g., PLL subsystem 47, voltage magnitude calculation system 48). However, in other embodiment, the rectangular-shaped figure elements may be implemented in hardware (e.g., integrated circuitry).

In one example, the PLL subsystem 47 may be a feedback system, in which the PLL subsystem 47 analyzes and processes each of the terminal voltages (e.g., single or three-phase) of the generator 14 received via the PTs 32, 34, and 36. The phases (e.g., timing) of each of the terminal voltages of the generator 14 may be compared to a voltage phase error level 49 threshold to compute voltage phase error. Similarly, the voltage magnitude calculation system 48 may analyze and process each of the terminal voltages (e.g., single or three-phase) of the generator 14, and compare the magnitude of each of the terminal voltages to a voltage magnitude level 50. Should the terminal voltages detected by the excitation system 24 (e.g., via the PLL subsystem 48 and voltage magnitude calculation system 48) be above (or below depending on user configuration) the respective voltage phase error level 49 and voltage magnitude level 50, the excitation system 24 may determine that one or more of the PTs 32, 34, and 36 has possibly failed and/or malfunctioned. Specifically, the output of the transformer failure detection system 44 may output a PT failure detection signal 70, and an appropriate control action (e.g., tripping of protective devices couple to the generator 14) may be executed by the excitation system 24. In one embodiment, the respective threshold values of the voltage phase error level 49 and the voltage magnitude level 50 may include per-unit (p.u.) voltage and phase values. Namely, the per-unit voltage and phase value may represent percentages of a predetermined and/or adjustable base value (e.g., terminal voltage and phase of the generator 14) normalized as the actual quantity (e.g., voltage, current, phase, and so forth) over a base quantity value. For example, in one embodiment, the voltage phase error level 49 threshold value may be set to approximately 0.12 p.u., between approximately 0.05 and 0.10 p.u., between approximately 0.1 and 0.15 p.u., between approximately 0.75 and 0.20 p.u., while the voltage magnitude level 50 may be set to approximately 0.1 p.u., between approximately 0.05 and 0.10 p.u., between approximately 0.1 and 0.15 p.u., or between approximately 0.75 and 0.20 p.u. Accordingly, a failure of one or more of the PTs 32, 34, and 36 may be detected by the excitation system 24 if one of the aforementioned threshold values is exceeded.

In certain embodiments, timers 52 and 54 and corresponding timer settings 58, 60, 62 and 64 may be included in the transformer failure detection system 44 to introduce, for example, time delays between the time certain PT failures are detected and the time a control action (e.g., providing a tripping signal to the generator 14) is executed by the excitation system 24. For example, in one embodiment, the timer 52 may be set to an approximately 0.25, 0.5 1, 2, 3, 5 second delay or more (as illustrated by time setting 56) to avoid a false PT failure detection due to voltage magnitude or voltage phase error that may become apparent during "Start Up" of the generator 14. The timer 54 may be an adjustable timer, and the settings 58, 60, and 62 may be set (or modified via a switch 64) according to the operating mode of the excitation system 24, and by extension, the operating mode for the generator 14 and the exciter 16. For example, as will be discussed in greater detail below, upon a detection of failure of one or more of the PTs 32, 34, and 36 by the transformer failure detection system 44, the excitation system 24 may switch from operating in a automatic voltage regulation (AVR) mode to operating in a field voltage regulation (FVR) mode to compensate for the absence of terminal voltage data provided by the PTs 32, 34, and 36.

As previously discussed, in certain embodiments, the excitation system 24 may operate in an AVR mode or an FVR mode based at least in part on the indication of the respective operating statuses (e.g., failed, operable, and so forth) of the PTs 32, 34, and 36. Specifically, in the AVR mode, the excitation system 24 may maintain terminal voltage of the generator 14 to constant value during, for example, various changes in load and/or operating conditions. However, the excitation system 24 may switch to operate in the FVR mode when a failure of one or more of the PTs 32, 34, and 36 is detected by the transformer failure detection system 44. In the FVR mode, the controller may regulate the field 22 voltage of the generator 14. However, it may be desirable to maintain operation of the generator at pre-failure conditions (e.g., conditions corresponding to the AVR mode).

As noted above, in certain embodiments, the transformer failure detection system 44 of the excitation system 24 may detect that one or more of the PTs 32, 34, and 36 has possibly failed if the magnitude and phase of the terminal voltage of the generator 14 exceed, for example, respective threshold levels 49 and 50. Nevertheless, in some instances, terminal voltage distortions (e.g., sagging voltages, increased voltage phase error, and the like) may result from electrical faults (e.g., line-to-ground, line-to-line, double line-to-ground) present on the AC line 28 and/or grid 26. Accordingly, in certain embodiments, as will be discussed in greater detailed with respect to FIG. 3, the failure detection deactivation system 46 may be communicatively coupled to the transformer failure detection system 44 to deactivate the detection system 44, and by extension, preclude switching from the AVR mode to the FVR mode when terminal voltage distortions are the result of an electrical fault as opposed to an actual failure of one or more of the PTs 32, 34, and 36.

Figure 3:
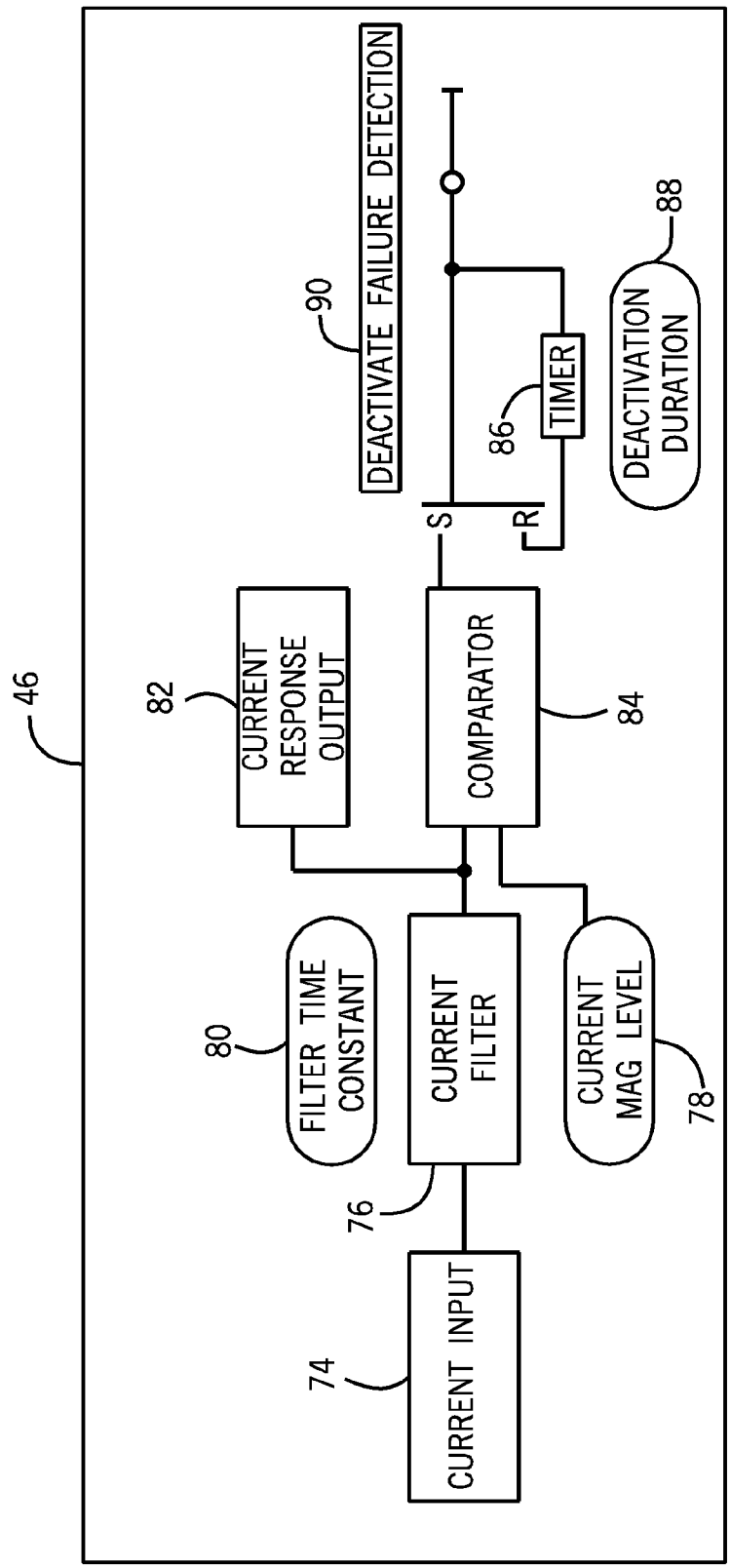
FIG. 3 is a schematic diagram of an embodiment of the failure detection deactivation system of FIG. 2, in accordance with present embodiments.

Accordingly, FIG. 3 is a schematic diagram of an embodiment of the failure detection deactivation system 46 as discussed above. As previously noted with respect FIG. 2, the rectangular-shaped figure elements (e.g., current input 74) may represent computational and/or sampling systems (e.g., software systems and/or hardware systems), while the oval-shaped figure elements (e.g., levels 78 and 80) may represent calculated, estimated, and/or programmed threshold parameters. Similarly, the deactivation system 46 may include hardware systems, software systems, or a combination thereof. As illustrated, the failure detection deactivation system 46 may include the current input 74, which may be a sample of the terminal current measurements received via the CTs 38, 40, and 42. It should be appreciated that, in a balanced three-phase system, the CTs 38, 40, and 42 may each measure symmetrical components, or a zero-sequence component, a positive-sequence component, and a negative-sequence component for each of the three phases. However, in one embodiment, the current input 74 may include only terminal current measurements received from two of the three CTs 38, 40, and 42, since there is generally no zero-sequence current in a balanced three-phase system such as the system 10.

The sampled current input 74 may be passed to a current filter 76 for further processing and analysis. In certain embodiments, the current filter 76 may be any electronic filter useful in outputting one or more current signals proportional to the current input 74. For example, in one embodiment, the current filter 76 may be a derivative filter used to output a current signal directly proportional to the time derivative of the current input 74. Yet, in another embodiment, the current filter 76 may be any multi-order filter useful in detecting a change in current indicative of an external fault as oppose to a PT failure. Particularly, the current filter 76 may be implemented as a transfer function to calculate the magnitude of a step in the current input 74, and compare the calculated magnitude of the current input 74 to a predetermined and/or adjustable threshold current magnitude level 78. In certain embodiments, the magnitude of the current input 74 may be calculated as the square root of the sum of squares of two or more current measurements received via the CTs 38, 40, and 42. Because a possible electrical fault on the AC line 28 and/or grid 26 may generate an increasing step in the response of the current magnitude, the transfer function of the current filter 76 may include a time constant 80 (e.g., derivative time constant) to generate a repeatable current response output 82 that is the time derivative of the current input 74. Specifically, the peak value of the current response output 82 may, in some embodiments, equal the magnitude of the step response of the current input 74, in which the peak value of the current response output 82 may occur at substantially a time corresponding to the time constant 80. It should be appreciated that the time constant 80 may be user-configurable value, and may be set to, for example, approximately 10 milliseconds (ms), 20 ms, 30 ms, and so forth, based upon system conditions.

In certain embodiments, the current response output 82 may then be compared to the threshold current magnitude level 78 via a comparator 84. If the current response output 82 is greater than the threshold current magnitude level 78, the output of the comparator 84 may be set (S), and a deactivation signal 90 (e.g., DEACTIVATE FAILURE DETECTION) may be outputted to the transformer failure detection system 44. In this way, the failure detection deactivation system 46 may differentiate between a sagging or distorted voltage condition due to an actual failure of one or more of the PTs 32, 34, and 36, and a sagging voltage condition due to an electrical fault on the AC line 28 and/or grid 26. In one embodiment, a timer 86 and corresponding timer setting 88 may be included in the deactivation system 46 to control the duration of time the output of the comparator 84 is set (S), and by extension, the duration of time in which the failure detection system 44 may be deactivated.

Figure 4:
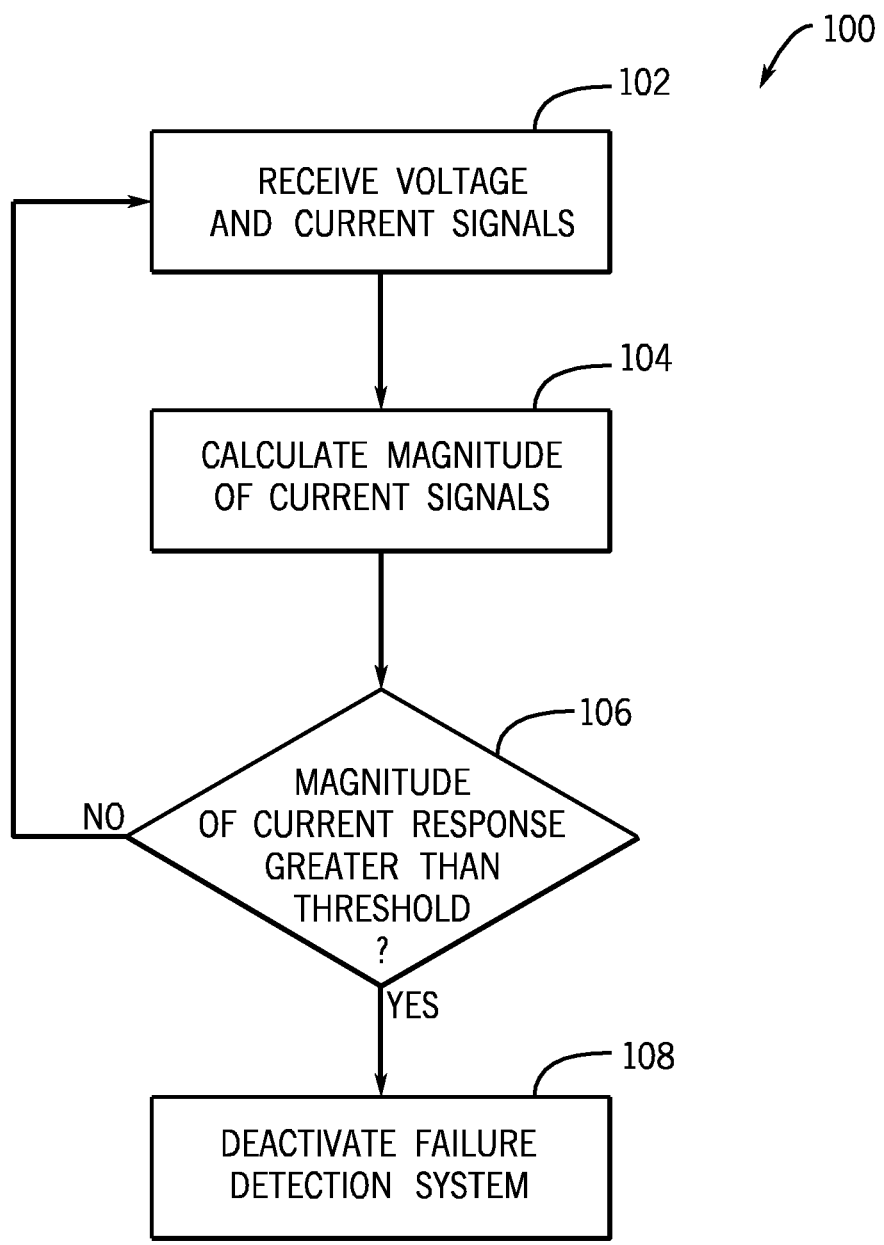
FIG. 4 is a flowchart illustrating an embodiment of a process suitable for deactivating the transformer failure detection system included in the system of FIG. 2, in accordance with present embodiments.
Figure 5:
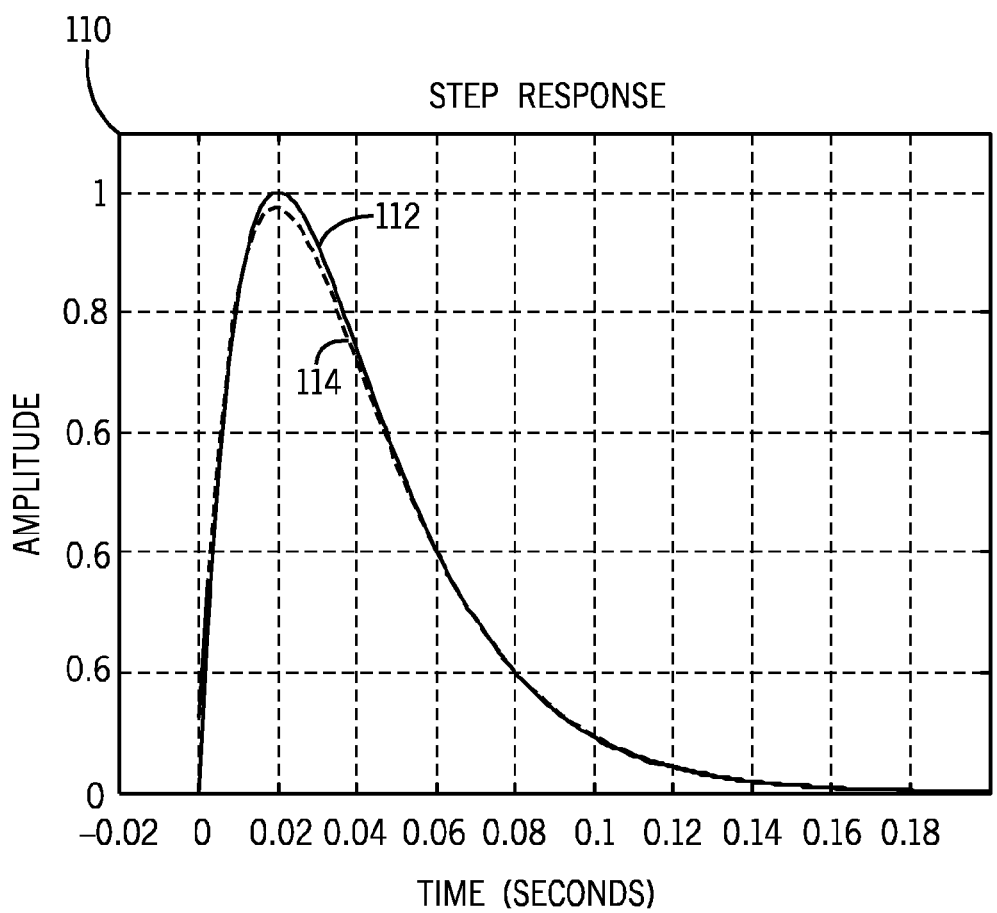
FIG. 5 is a plot diagram of an embodiment of a current step response signal and a current threshold step response signal, in accordance with present embodiments.

Turning now to FIG. 4, a flow diagram is presented, illustrating an embodiment of a process 100 useful in detecting electrical faults and controlling transformer failure detection, and by extension, the mode of operation of the power generating system 10 depicted in FIG. 1. Further, for the purpose of illustration, the flow diagram of FIG. 4 may be discussed in conjunction with the plot diagram of FIG. 5. The process 100 may include code or instructions stored in a non-transitory machine-readable medium (e.g., a memory) and executed, for example, by one or more processors included within the excitation system 24. The process 100 may begin with the excitation system 24 receiving (block 102) voltage and current output signals of the generator 14. As previously discussed, the excitation system 24 may received voltage inputs via the PTs 32, 34, and 36 coupled to, for example, the terminals of the generator 14. Similarly, the excitation system 24 may received current inputs via the CTs 38, 40, and 42 also coupled to, for example, the terminals of the generator 14. Specifically, the voltage inputs received via the PTs 32, 34, and 36 and the current inputs received via the CTs 38, 40, and 42 may be used by the excitation system 24 to provide power, control, and monitoring to the generator 14 and/or the exciter 16. For example, in certain embodiments, the voltage inputs received via the PTs 32, 34, and 36 may be used to detect a possible failure of one or more of the PTs 32, 34, and 36. In another example, the voltage inputs may be used to detect an overvoltage condition of the generator 14, in which case the excitation system 24 may then transmit a tripping signal to the one or more protective devices (e.g., fuses, switches, reclosers) that may be coupled to the generator 14 and/or the exciter 16.

The process 100 may continue with the excitation system 24 calculating (block 104) the magnitude of the current inputs received via the CTs 38, 40, and 42. In certain embodiments, the current inputs received via the CTs 38, 40, and 42 may supplement the voltage inputs received via the PTs 32, 34, and 36. For example, as discussed above with respect to FIG. 3, an electrical fault may occur on the AC lines 28 and/or grid 26. Accordingly, without the presently disclosed embodiments of transformer failure detection and control, the transformer failure detection system 44 of the excitation system 24 may detect sagging (e.g., low) or distorted voltage inputs as a possible indication of a failure of one or more of the PTs 32, 34, and 36. The excitation system 24 may then switch from operating in the AVR mode to operating in the FVR mode. However, because the detected sagging or distorted voltage inputs may be the result of an electrical fault, and not the result of an actual failure of the PTs 32, 34, and 36, the excitation system 24 may switch from the AVR mode to the FVR mode prematurely, or at an otherwise inopportune time. Thus, the current inputs received via the CTs 38, 40, and 42 may be used by the excitation system 24 to differentiate between sagging voltage conditions resulting from electrical faults on the AC lines 28, for example, and those due to actual failures of one or more of the PTs 32, 34, and 36.

In certain embodiments, the excitation system 24 may determine (decision 106) whether or not an electrical fault has occurred by comparing the calculated magnitude of the response of the current inputs to a predetermined or adjustable (e.g., user-configurable) threshold current magnitude. For example, as depicted by an embodiment of a response plot 110 in FIG. 5, a filtered derivative of the magnitude of the current inputs may be calculated, and a current step response signal 112 may be compared to a predetermined or user-adjustable step response signal 114. In other words, in one embodiment, the current step response signal 112 may be the time derivative of the step response signal 114. If the magnitude of the current step response signal 112 is determined to be greater than that of the step response signal 114, the failure detection deactivation system 46 of the excitation system 24 may determine that an electrical fault has occurred as opposed to a failure of one or more of the PTs 32, 34, and 36. In another embodiment, the excitation system 24 may measure the value of overshoot (e.g., a percentage of the difference between the peak amplitude and the magnitude divided by the magnitude) between the peak amplitude of the current step response signal 112 and that of the step response signal 114 to detect an electrical fault. Yet still, in another embodiment, the excitation system 24 may measure the rise time (e.g., rate of increase) of the current step response signal 112, because a fast rise time of the current step response signal 112 may also indicate the presence of an electrical fault.

Upon detection of an electrical fault, the failure detection deactivation system 46 of the excitation system 24 may then output a deactivation signal to deactivate (block 108) the transformer failure detection system 44 of the excitation system 24, and by extension, block the excitation system 24 from switching from the AVR mode to the FVR mode of operation. Accordingly, by differentiating between actual failures of one or more of the PTs 32, 34, and 36 and electrical faults, the present embodiments may increase efficiency and reliability of the power generating system 10 by decreasing system disturbances such as untimely overvoltage tripping of the generator 14 and/or the exciter 16.

Technical effects of the disclosed embodiments include systems and methods useful in differentiating between abnormal voltage conditions resulting from electrical faults and those conditions due to actual failures of one or more of PTs and/or VTs that may be included, for example, within a power generating system. In one embodiment, an excitation system includes a transformer failure detection system and a failure detection deactivation system. The transformer failure detection system may be configured to detect abnormal voltages as a possible indication of a failure of one or more of PTs and/or VTs. The failure detection deactivation system may be use to deactivate the transformer failure detection system when abnormal voltage conditions result from electrical faults, and to not deactivate the transformer failure detection system when the abnormal voltage conditions result from actual failures of the one or more of PTs and/or VTs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an excitation system configured to regulate one or more outputs of a power generating system configured to provide power to an electrical power grid, comprising:
data processing circuitry configured to obtain an electrical voltage measurement and an electrical current measurement from the power generating system;
a transformer failure detection system configured to detect an abnormality associated with the electrical voltage and electrical current measurements as an indication of a transformer failure; and
a failure detection deactivation system configured to deactivate the transformer failure detection system based at least in part on whether the abnormality comprises one of a first condition or a second condition.

2. The system of claim 1, wherein the abnormality comprises a sagging voltage, a distorted voltage, a distorted voltage phase error, or a combination thereof.

3. The system of claim 1, wherein the first condition comprises a sagging voltage resulting from a potential transformer (PT) failure, and wherein the failure detection deactivation system is configured to not deactivate the transformer failure detection system when the abnormality comprises the first condition.

4. The system of claim 1, wherein the second condition comprises an electrical fault, and wherein the failure detection deactivation system is configured to deactivate the transformer failure detection system when the abnormality comprises the second condition.

5. The system of claim 1, comprising:
a generator configured to provide an electrical power, a mechanical power, or a combination thereof; and
a generator exciter coupled to the generator, wherein the excitation system is configured to regulate an output of the generator based at least in part on the electrical voltage and electrical current measurements.

6. The system of claim 1, wherein the data processing circuitry is configured to receive the electrical voltage measurement via one or more potential transformers (PTs) coupled to a generator of the power generating system, and to receive the electrical current measurement via a plurality of current transformers (CTs) coupled to the generator of the power generating system, wherein the electrical current measurement is used to determine whether the abnormality comprises the first condition or the second condition.

7. The system of claim 1, wherein the failure detection deactivation system is configured to derive a deactivation signal by:
computing a square root of a sum of squares of the electrical current measurement to compute an electrical current magnitude;
computing a filtered derivative of the electrical current magnitude; and
comparing the filtered derivative of the electrical current magnitude to a current threshold value, wherein the deactivation signal is generated when the filtered derivative of the electrical current magnitude exceeds the current threshold value.

8. The system of claim 7, wherein the failure detection deactivation system is configured to compute the filtered derivative by, at least in part, computing a step response of the electrical current magnitude, wherein a rise time of the step response is detected as an indication of an electrical fault.

9. The system of claim 7, wherein the failure detection deactivation system is configured to compare the filtered derivative of the electrical current magnitude to the current threshold value by, at least in part, calculating an overshoot between a peak of a step response of the electrical current magnitude and a peak of a step response of the current threshold value.

10. The system of claim 1, wherein the transformer failure comprises a failure of a potential transformer (PT), a voltage transformer (VT), a capacitance potential transformer, or a combination thereof.

11. The system of claim 1, wherein the failure detection deactivation system is configured to limit overvoltage tripping of the power generating system by deactivating the transformer failure detection system when the abnormality comprises the second condition.

12. A non-transitory computer-readable medium having computer executable code stored thereon, the code comprising instructions to:
obtain an electrical voltage and an electrical current measurement from a power generating system configured to provide power to an electrical power grid;
detect an abnormality associated with the electrical voltage and electrical current measurements as an indication of a transformer failure; and
deactivate a transformer failure detection system based at least in part on whether the abnormality comprises one of a first condition or a second condition.

13. The non-transitory computer-readable medium of claim 12, wherein the code comprises instructions to detect a sagging voltage, a distorted voltage, a distorted voltage phase error, or a combination thereof, as the indication of the transformer failure.

14. The non-transitory computer-readable medium of claim 12, wherein the code comprises instructions to:
compute an electrical current magnitude by computing a square root of a sum of squares of the electrical current measurement;
compute a filtered derivative of the electrical current magnitude; and
compare the filtered derivative of the electrical current magnitude to a current threshold value, wherein the deactivation signal is generated when the filtered derivative of the electrical current magnitude exceeds the current threshold value.

15. The non-transitory computer-readable medium of claim 14, wherein the instructions to compute the filtered derivative comprises instructions to compute a step response of the electrical current magnitude, wherein a rise time of the step response is detected as an indication of an electrical fault.

16. The non-transitory computer-readable medium of claim 14, wherein the code comprises instructions to calculate an overshoot between a peak of a step response of the electrical current magnitude and a peak of a step response the current threshold value.

17. A system, comprising:
an excitation system configured to regulate an output of a power generating system configured to provide power to an electrical power grid, comprising:
a transformer failure detection system configured to detect an abnormality from an electrical voltage measurement and an electrical current measurement as an indication of a transformer failure; and
a failure detection deactivation system configured to:
calculate a magnitude of the electrical current measurement; and
deactivate the transformer failure detection system when the magnitude of the electrical current measurement exceeds a predetermined current magnitude threshold.

18. The system of claim 17, wherein the failure detection deactivation system is configured to compute a filtered derivative of the electrical current magnitude and compare the filtered derivative of the electrical current magnitude to a current threshold value, wherein a deactivation signal is generated when the filtered derivative of the electrical current magnitude exceeds the current threshold value.

19. The system of claim 18, wherein the failure detection deactivation system is configured to compute a step response of the electrical current magnitude, wherein a rise time of the step response is detected as an indication of an electrical fault.

20. The system of claim 17, comprising a plurality of potential transformers (PTs) and a plurality of current transformers (CTs) coupled to a generator, wherein the transformer failure detection system is configured to detect a possible failure of at least one of the plurality of PTs, and wherein the failure detection deactivation system is configured to deactivate the transformer failure detection system based upon electrical current measurements received from the plurality of CTs.

* * * * *